United States Patent
Ljung et al.

(10) Patent No.: US 10,555,343 B2
(45) Date of Patent: Feb. 4, 2020

(54) DYNAMIC BACK-OFF TIME BASED ON CHANNEL UTILIZATION STATISTICS

(71) Applicant: Sony Mobile Communications Inc., Tokyo (JP)

(72) Inventors: Rickard Ljung, Helsingborg (SE); Kåre Agardh, Rydebäck (SE)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 15/779,701

(22) PCT Filed: Nov. 30, 2015

(86) PCT No.: PCT/EP2015/078070
§ 371 (c)(1),
(2) Date: May 29, 2018

(87) PCT Pub. No.: WO2017/092785
PCT Pub. Date: Jun. 8, 2017

(65) Prior Publication Data
US 2019/0223217 A1    Jul. 18, 2019

(51) Int. Cl.
*H04W 74/08* (2009.01)
*H04W 24/08* (2009.01)
(Continued)

(52) U.S. Cl.
CPC ....... *H04W 74/0816* (2013.01); *H04W 24/08* (2013.01); *H04W 28/0289* (2013.01); *H04W 72/1215* (2013.01)

(58) Field of Classification Search
CPC ............. H04W 74/0816; H04W 24/08; H04W 28/0289; H04W 72/1215; H04W 74/0808
See application file for complete search history.

(56) References Cited

U.S. PATENT DOCUMENTS

| | | | |
|---|---|---|---|
| 2004/0028003 A1* | 2/2004 | Diener | H04L 1/0001 370/319 |
| 2005/0089002 A1* | 4/2005 | Shin | H04W 28/18 370/338 |

(Continued)

FOREIGN PATENT DOCUMENTS

| WO | 2010086734 A1 | 8/2010 |
| WO | 2011093906 A1 | 8/2011 |
| WO | 2014111309 A1 | 7/2014 |

OTHER PUBLICATIONS

International Search Report and Written Opinion; dated Aug. 1, 2016; issued in International Patent Application No. PCT/EP2015/078070.

*Primary Examiner* — Duc C Ho
(74) *Attorney, Agent, or Firm* — Tucker Ellis LLP (57) ABSTRACT

A method for improving fairness among devices accessing a radio bandwidth. The devices include a mobile device using the radio bandwidth to access a radio access system using a channel access protocol, wherein the channel access protocol is a collision avoidance-type channel access protocol configured for using a back-off time before transmitting a retransmission (e.g., CSMA). Information is determined from the radio bandwidth. The information is analyzed to determine an adjusted back-off time. The mobile device implements the adjusted back off time before transmitting the retransmission over the radio bandwidth.

18 Claims, 8 Drawing Sheets

(51) Int. Cl.
    *H04W 28/02*     (2009.01)
    *H04W 72/12*     (2009.01)

(56)     References Cited

U.S. PATENT DOCUMENTS

| | | | |
|---|---|---|---|
| 2008/0318625 A1* | 12/2008 | Rofougaran | A63F 13/235 |
| | | | 455/556.1 |
| 2012/0275334 A1 | 11/2012 | Hamada et al. | |
| 2014/0349745 A1* | 11/2014 | Russo | H04W 72/02 |
| | | | 463/29 |
| 2015/0172012 A1* | 6/2015 | Abeysekera | H04J 1/00 |
| | | | 370/329 |
| 2015/0208253 A1 | 7/2015 | Kim et al. | |
| 2016/0066208 A1* | 3/2016 | Baron | H04W 74/085 |
| | | | 370/230 |
| 2016/0198493 A1* | 7/2016 | Lin | H04W 74/0816 |
| | | | 370/336 |

* cited by examiner

```
DETERMINE THE ADJUSTED BACK-OFF TIME BASED ON THE
MAXIMUM DETECTED FRAME SPACING WHEN THE DETERMINED
LEVEL OF CHANNEL ASSESSMENT AGGRESSIVENESS IS A LOW
LEVEL
610
          │
          ▼
DETERMINE THE ADJUSTED BACK-OFF TIME BASED ON THE
MINIMUM DETECTED FRAME SPACING WHEN THE DETERMINED
LEVEL OF CHANNEL ASSESSMENT AGGRESSIVENESS IS A HIGH
LEVEL
620
          │
          ▼
DETERMINE THE ADJUSTED BACK-OFF TIME BASED ON THE
MEDIAN OR AVERAGE DETECTED FRAME SPACING WHEN THE
DETERMINED LEVEL OF CHANNEL ASSESSMENT
AGGRESSIVENESS IS A MEDIUM LEVEL
630
```

DYNAMIC BACK-OFF TIME BASED ON CHANNEL UTILIZATION STATISTICS

FIELD OF THE INVENTION

In general, embodiments of the invention relate to mobile communication network communications and, more particularly, to utilizing unlicensed, free radio spectrum for cellular operator-owned communications.

BACKGROUND

Recently, cellular technologies such as 4G/LTE are starting to use unlicensed, free radio spectrum for cellular operator-owned communications. A primary example of such unlicensed spectrum is the so-called "5 GHz band". The 5 GHz band is one of the frequency bands where wireless fidelity (Wi-Fi or WI-FI) is currently deployed. In various jurisdictions in the world, such unlicensed bands may be used with very little or no regulation and/or restriction. For example, generally there is no requirement for devices to utilize a listen-before-talk (LBT) algorithm for channel assessment. In other words, a wireless device operating in the unlicensed band may, at any time, send data without considering whether its transmission will conflict with ongoing traffic between other devices.

The 802.11 wireless local area network (WLAN) standard uses carrier sense multiple access (CSMA) protocol, which requires that devices listen before starting to transmit. If traffic on the network is heavy, use of such LBT protocols may reduce the possibilities for a device to transmit.

Therefore, a need exists to develop apparatus, systems, methods and the like that will share the time allocation between different systems existing within the same frequency band such as an unlicensed band like the 5 GHz band where Wi-Fi exists.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for improving fairness among devices accessing a radio bandwidth, the devices including a mobile device using the radio bandwidth to access a radio access system using a channel access protocol, wherein the channel access protocol is a collision avoidance-type channel access protocol configured for using a back-off time before transmitting a retransmission.

According to embodiments of the invention, a method includes determining information from the radio bandwidth, wherein the information comprises inter-system packet transmission information; analyzing the inter-system packet transmission information to determine an adjusted back-off time; and implementing, by a mobile device, the adjusted back-off time before transmitting the retransmission over the radio bandwidth.

In some embodiments, the channel access protocol is the carrier sense multiple access (CSMA) protocol.

In some embodiments, determining the information comprises monitoring the radio bandwidth; and collecting transmission statistics related to the radio bandwidth.

In some embodiments, determining the information comprises monitoring the radio bandwidth; and collecting information indicating channel free lengths and channel busy lengths.

In some embodiments, determining the information comprises monitoring the radio bandwidth; and collecting information indicating an amount of channel utilization.

In some embodiments, analyzing the information comprises determining a level of channel assessment aggressiveness from a plurality of levels; and determining the adjusted back-off time based on the determined level of channel assessment aggressiveness. In some such embodiments, the method also includes determining, from the information, statistics corresponding to detected frame spacings between packets; and determining the adjusted back-off time is further based on the statistics. In some of these embodiments, the statistics are indicative of at least a minimum, a maximum, and a median or average detected frame spacing; where the plurality of levels comprises a low level, a medium level and a high level; where determining the adjusted back-off time comprises determining the adjusted back-off time based on the maximum detected frame spacing when the determined level of channel assessment aggressiveness is a low level; determining the adjusted back-off time based on the minimum detected frame spacing when the determined level of channel assessment aggressiveness is a high level; and determining the adjusted back-off time based on the median or average detected frame spacing when the determined level of channel assessment aggressiveness is a medium level.

In some embodiments, determining comprises determining, by the mobile device, information from the radio bandwidth; and analyzing comprises analyzing, by the mobile device, the inter-system packet transmission information to determine an adjusted back-off time comprises. In some such embodiments, the channel access protocol comprises standardized, predetermined parameters for accessing the radio access system. In other such embodiments, the channel access protocol comprises non-standardized parameters for accessing the radio access system.

In some embodiments, the method also includes receiving, by the mobile device and from an access point, the adjusted back-off time, wherein the access point analyzed the information to determine the adjusted back-off time. In some such embodiments, receiving comprises receiving, by the mobile device over a unicast transmission from the access point, the adjusted back-off time. In other such embodiments, receiving comprises receiving, by the mobile device over a broadcast transmission from the access point, the adjusted back-off time. In yet other such embodiments, the access point analyzes the information to determine the adjusted back-off time based on a standardized protocol for establishing back-off times for devices.

In some embodiments, implementing the back-off time includes determining a random number corresponding to a wait time within the back-off time; and waiting the wait time before transmitting.

According to embodiments of the invention, a mobile communication system includes an access point (AP); and a user equipment (UE) configured to operatively couple to the AP over a channel on a radio bandwidth, the user equipment configured to determine information from the radio bandwidth, wherein the information comprises inter-system packet transmission information; analyze the inter-system packet transmission information to determine an adjusted back-off time; and implement the adjusted back-off time before transmitting the retransmission over the radio bandwidth.

In some such embodiments, the channel access protocol is the carrier sense multiple access (CSMA) protocol.

In some such embodiments, determining the information comprises monitoring the radio bandwidth; and collecting transmission statistics related to the radio bandwidth.

According to embodiments of the invention, a computer program product, comprising a non-transitory computer-readable medium comprising computer-executable instructions comprising instructions for determining information from the radio bandwidth, wherein the information comprises inter-system packet transmission information; instructions for analyzing the inter-system packet transmission information to determine an adjusted back-off time; and instructions for implementing the adjusted back-off time before transmitting the retransmission over the radio bandwidth.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A "node" or "device" may be or include a station, user equipment ("UE"), a mobile device, a mobile communication device and/or the like. For the purpose of sending or receiving data, the device may connect to a wireless local area network ("WLAN") or a mobile communication network such as a radio access system (including evolution of 3GPP LTE releases, 3GPP LAA releases, and 5th Generation ("5G") LTE releases). Any network described herein may have one or more base stations ("BS") and/or access points ("AP").

According to 802.11 standards, the Wi-Fi system uses a carrier sense multiple access (CSMA) protocol whereby a packet collision results in the use of a back-off or back-off time. This back-off requires that a retransmission is delayed until the back-off time has elapsed. According to the 802.11 standard, the back-off time, which is measured in number of slot times, is first selected as a random number between one (1) and a minimum contention window (CWmin) of thirty-one (31). The standard requires that the number is then increased exponentially in case of repeated packet collisions.

In some cases, systems have significantly different slot definitions (e.g., determining packet lengths, back-off times, etc.) than other systems. Such a situation likely results in channel usage being dominated by the technology with the smallest slot times.

Embodiments of the invention determine inter-system packet transmission patterns and, based on the patterns, adjust the back-off times within a collision-avoidance type channel access protocol such as CSMA.

When a node is using the back-off time for a retransmission, the node determines the end of a time window of transmit opportunity. Before attempting a retransmission, a random value is drawn within this time window. So performing retransmission according to the backoff time indicates that the transmission will occur at any random time in-between the first possible available time to transmit and the expiration of the backoff time. Thus, in some embodiments, "implementing the back-off time" includes determining a random number within the back-off time and waiting an amount of time corresponding to the random number within the back-off time before transmitting.

A node utilizing one of multiple radio access systems that coexist on the same frequency band can scan the channel utilization properties. The determined data may include statistics on channel free/busy lengths, amount of channel utilization and the like. Based on the collected information, the node can determine a suitable back-off time for handling retransmissions. Different levels of aggressiveness may be implemented by adjusting the back-off times according to minimum, maximum or median/average detected spacings between packets and/or according to an amount of channel utilization.

Implementation of embodiments of the invention may be or include two configurations: (I) where each individual node takes measurements and selects individual back-off times based thereon and (II) where access points take measurements and select back-off times for stations within their coverage areas. Configuration (I) implies either standardized or non-standardized parameter selections for a specific radio access system; whereas configuration (II) uses a standardized protocol for communicating back-off times to stations.

More particularly, embodiments provide for improving fairness among devices accessing a radio bandwidth, the devices including a mobile device using the radio bandwidth to access a radio access system using a channel access protocol, wherein the channel access protocol is a collision avoidance-type channel access protocol configured for using a back-off time before transmitting a retransmission (e.g., CSMA). Embodiments determine information from the radio bandwidth, where the information comprises inter-system packet transmission information; analyze the inter-system packet transmission information to determine an adjusted back-off time; and implement, by a mobile device, the adjusted back-off time (including drawing and waiting a random number within the back-off time) before transmitting the retransmission over the radio bandwidth.

In some embodiments, the determination of back-off time is standardized. A node may measure statistics and/or evaluate parameters/characteristics of the channel (e.g., inter-packet lengths and/or channel occupancy), and the standardized documentation (i.e., that are implemented by the nodes of the system) maps the measured statistics to pre-determine the value of the back-off time. In some cases, as discussed in further detail below, a look up table or a formula for calculation is defined by the standard. Thus, in some instances, both the parameters/characteristics of the channel to be considered in setting the back-off time and/or the method detailing how to derive the back-off time based on the characteristics/parameters is standardized.

In other embodiments, the determination of back-off time is non-standardized. In some cases, individual device manufacturers may define parameters/characteristics of the channel to be considered in setting the back-off time and/or the method detailing how to derive the back-off time based on the characteristics/parameters. In other embodiments, a configuration interface or other program/application running on one or more nodes defines its own parameters/characteristics to take into account in determining the back-off time and/or the method detailing how to derive the back-off time based on the characteristics/parameters.

Some embodiments of the invention monitor the radio bandwidth to collect transmission statistics including (i) statistics related to the radio bandwidth, (ii) information indicating channel free lengths and channel busy lengths, and/or (iii) information indicating an amount of channel utilization.

In some cases, embodiments of the invention use a selected level of channel assessment aggressiveness to determine the adjusted back-off time such as by determining statistics corresponding to detected frame spacings between packets indicative of a minimum, maximum and median/average spacing. The adjusted back-off time may be based on the level of aggressiveness, where a low level corresponds to the maximum spacing, a high level corresponds to the minimum spacing and a medium level corresponds to the median or average spacing.

In various embodiments, standardized parameters are used for accessing the radio access system, and in some cases, an access point analyzes the information to determine the adjusted back-off time and then unicasts/broadcasts the adjusted back-off time.

Figure 1:
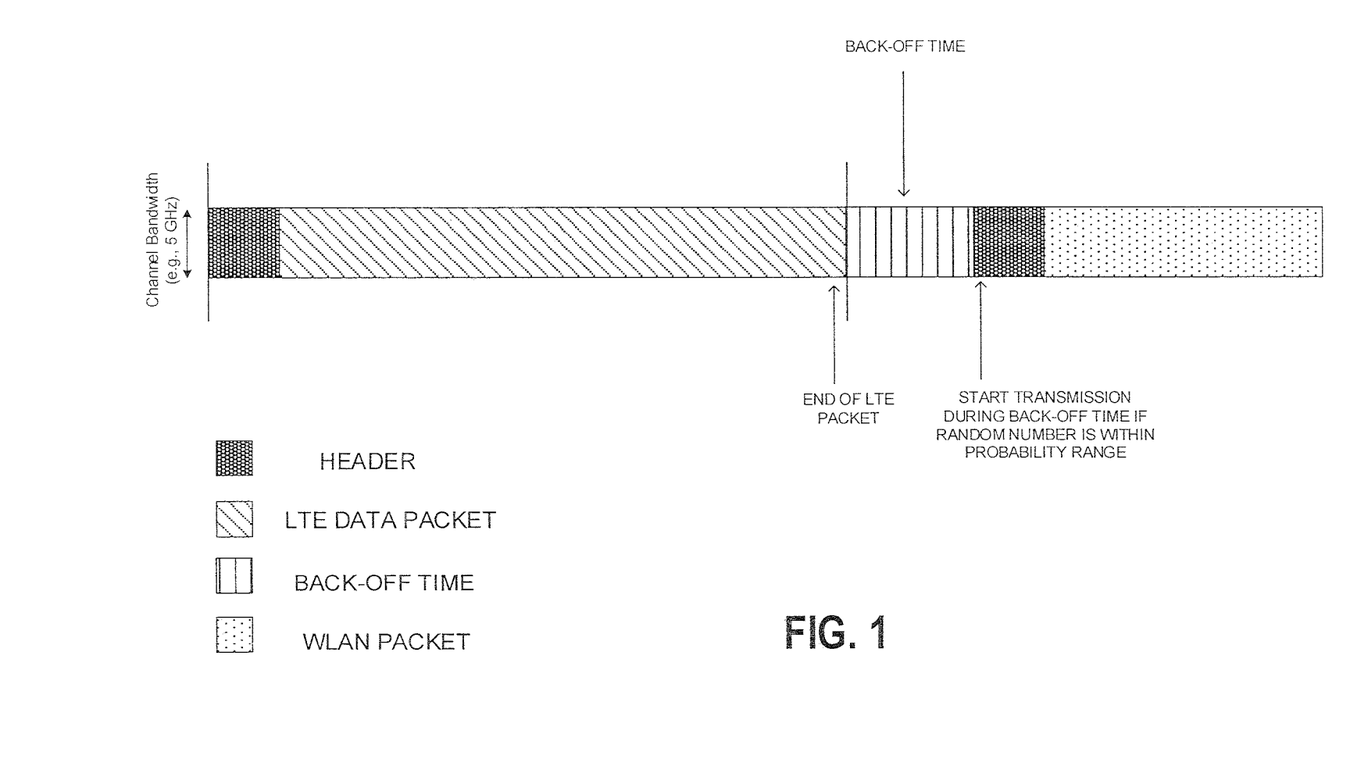
FIG. 1 is a diagram of a channel transmission illustrating implementation of dynamic back-off time according to embodiments of the invention.

Referring now to FIG. 1, a diagram of a channel transmission illustrates implementation of a dynamic back-off time according to embodiments of the invention. As shown, an LTE data packet is transmitted first, and after the LTE packet has ended, a back-off time elapses before transmission of a WLAN packet.

Figure 2:
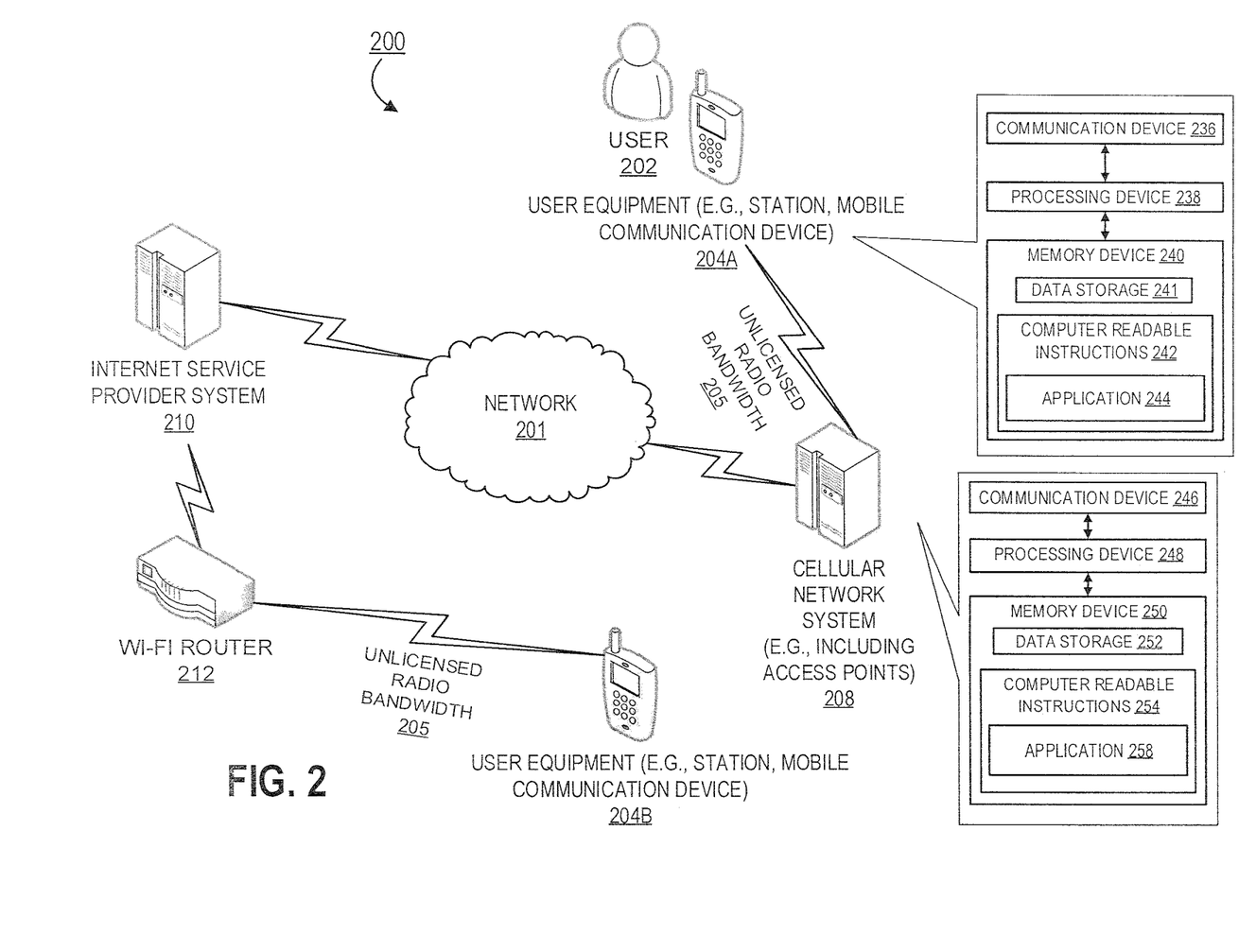
FIG. 2 is a diagram of a User Equipment (UE), operating in an environment according to embodiments of the invention.

As shown in FIG. 2, a diagram illustrates a User Equipment (UE) (which may be any type of node such as a station, mobile device, access point, or the like that is configured to access a radio access system such as a cellular network system), operating in an environment according to embodiments of the invention.

The cellular network system 208 may be or include one or more base stations and/or access points and, in some embodiments, generally includes a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally includes a modem, server, or other device for communicating with other devices on the network 201, which may include, for example, transmitting reference signals to LTE devices.

As further illustrated in FIG. 2, the cellular network system 208 includes computer-readable instructions 254 stored in the memory device 250, which in one embodiment includes the computer-readable instructions 254 of an application 258. In some embodiments, the memory device 250 includes data storage 252 for storing data related to and/or used by the application 258.

As illustrated in FIG. 2, the user equipment 204A (e.g., a station, mobile device, etc.) generally includes a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally includes a modem, server, or other device for communicating with other devices on the network 201.

As further illustrated in FIG. 2, the user equipment 204A includes computer-readable instructions 242 stored in the memory device 240, which in one embodiment includes the computer-readable instructions 242 of an application 244. In the embodiment illustrated in FIG. 2, the application 244 allows the user equipment 206A to be linked to the cellular network system 208 to communicate, via a network 201. The application 244 may also allow the user equipment 206A to connect directly (i.e., locally or device to device) with the user equipment 206B. User equipment 206B (e.g., a station, mobile device, or the like) may include one or more components similar to those described with reference to user equipment 206A.

FIG. 2 illustrates the UE 204A accessing the cellular network system 208 using an unlicensed radio bandwidth 205. Similarly, UE 204B accesses WI-FI router 212 over the unlicensed radio bandwidth 205, which enables access to network 201 through internet service provider system 210. Accordingly, both UEs 204A and 204B are utilizing the same unlicensed radio bandwidth. Assuming the UEs are collocated or located in a relatively close geographic proximity, there is an opportunity for data transmission collision. Embodiments of the present invention assist in minimizing such collisions and generally increasing overall communication efficiencies on the channel, especially when many devices are attempting to transmit on the same channel.

The servers, systems, and/or devices described herein illustrate one embodiment of the invention. It is further understood that one or more of the servers, systems, and devices can be combined in other embodiments and still function in the same or similar way as the embodiments described herein.

Figure 3:
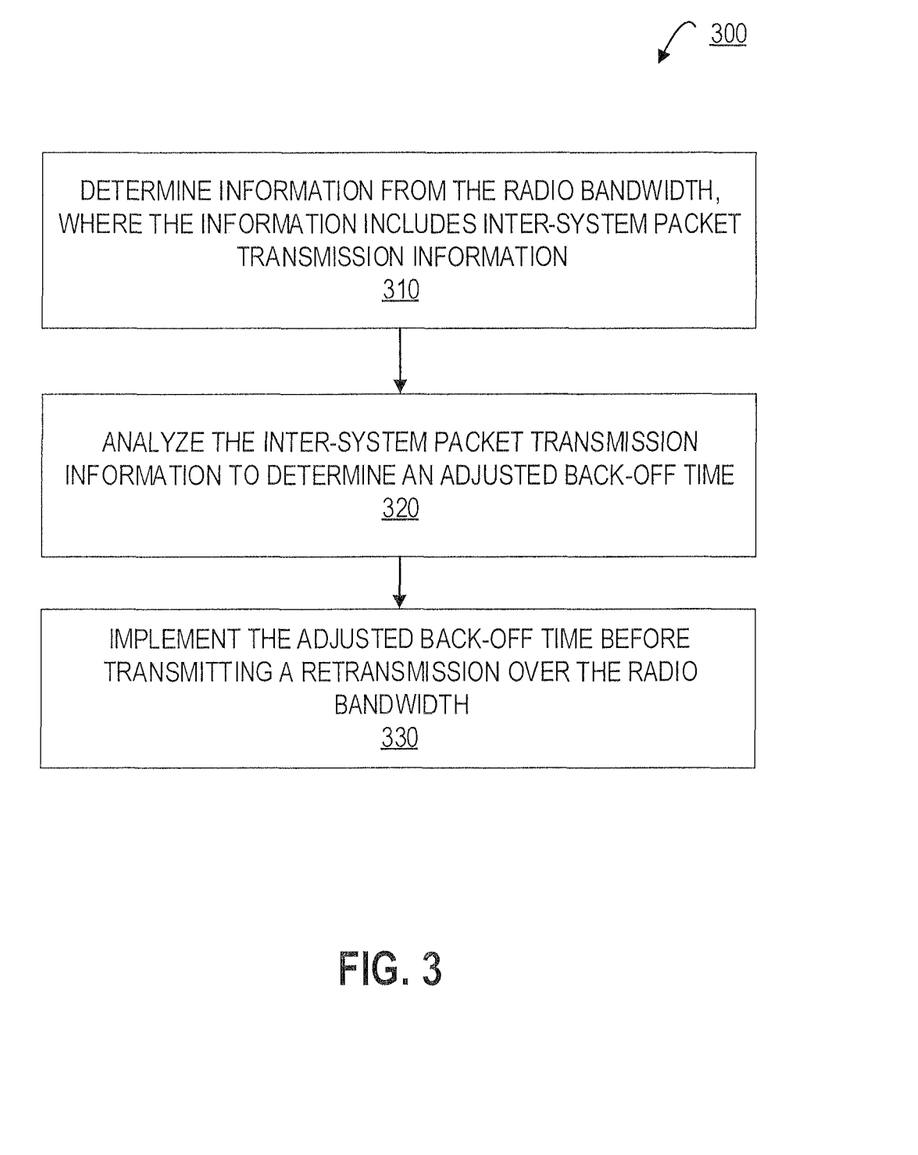
FIG. 3 is a flowchart illustrating a method for improving fairness among devices accessing a radio bandwidth according to embodiments of the invention.

Referring now to FIG. 3, a flowchart illustrates a method 300 for improving fairness among devices accessing a radio bandwidth according to embodiments of the invention. The devices include a mobile device using the radio bandwidth to access a radio access system using a channel access protocol, wherein the channel access protocol is a collision avoidance-type channel access protocol configured for using a back-off time before transmitting a retransmission. The first step, as represented by block 310, is for a node to determine information from the radio bandwidth. The information includes inter-system packet transmission information.

The next step, as represented by block 320, is for a node to analyze the inter-system packet transmission information to determine an adjusted back-off time. Finally, the mobile device implements the adjusted back-off time before transmitting a retransmission over the radio bandwidth. In some embodiments, as discussed above, implementing the adjusted back-off time includes determining a random number within the back-off time and waiting an amount of time corresponding to the random number within the back-off time before transmitting. For example, if he back-off time is one-hundred (100) units, a random number within one-hundred (100) units may be selected. If a fifteen (15) is selected, for example, then the node will wait fifteen (15) units past the beginning of the back-off time before transmitting. Furthermore, in cases where the adjusted back-off time is determined by a device other than the mobile device, the mobile device receives the adjusted back-off time from the other device.

Figure 4:
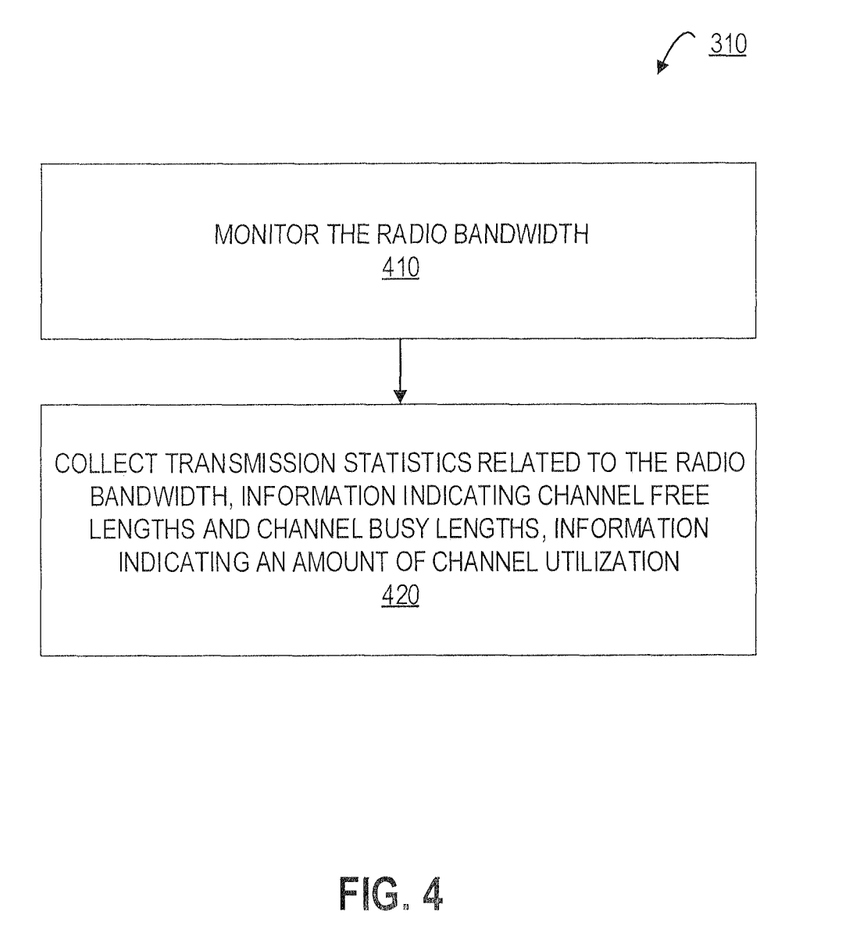
FIG. 4 is a flowchart illustrating a method for determining information from the radio bandwidth according to embodiments of the invention.

Referring now to FIG. 4, a flowchart illustrates a method 310, which was first discussed with reference to FIG. 3 above. Step 310 is for determining information from the radio bandwidth according to embodiments of the invention and can be broken into multiple, optional sub-steps. First, a node may monitor the radio bandwidth, as represented by block 410, and second, a node may (i) collect transmission statistics related to the radio bandwidth, (ii) collect information indicating channel free/busy lengths, and/or (iii) collect information indicating an amount of channel utilization, as shown in block 420.

Figure 5:
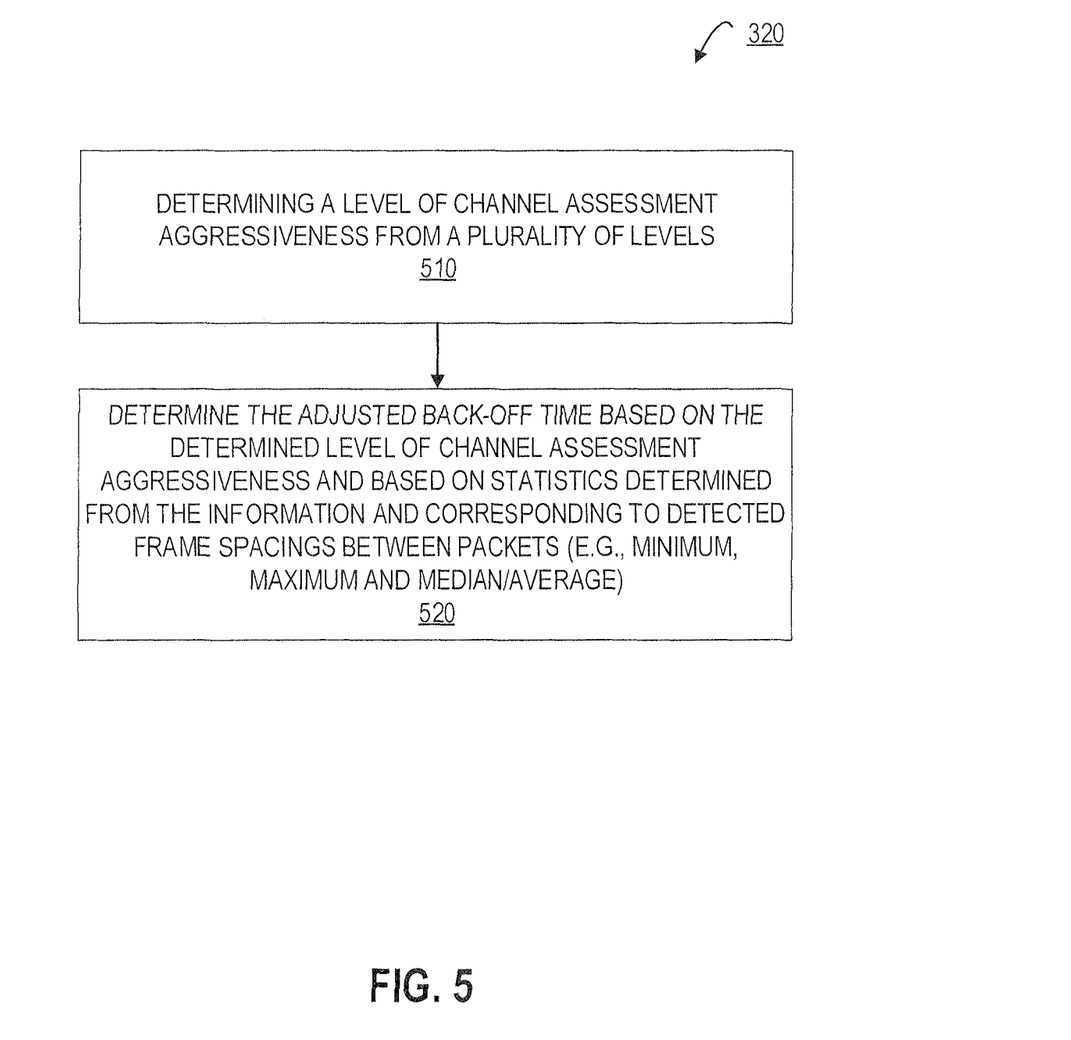
FIG. 5 is a flowchart illustrating a method for analyzing information to determine an adjusted back-off time according to embodiments of the invention.

Referring now to FIG. 5, a flowchart illustrates a method 320, which was first discussed with reference to FIG. 3 above. Step 320 is for analyzing information to determine an adjusted back-off time according to embodiments of the invention and may optionally include multiple sub-steps. First, a node may determine a level of channel assessment aggressiveness from a plurality of levels. In some embodiments, a user or administrator may pre-set this level of aggressiveness or it may be dynamic (i.e., automatically adjusted) based on one or more of the statistics discussed herein or other parameters such as the number of detected radio access systems.

Second, a node may determine the adjusted back-off time based on the determined level of channel assessment aggressiveness as well as on the statistics determined from the information. As discussed above, a node may use a selected level of channel assessment aggressiveness to determine the adjusted back-off time such as by determining statistics corresponding to detected frame spacings between packets indicative of a minimum, maximum and median/average spacing. The adjusted back-off time may be based on the level of aggressiveness, where a low level corresponds to the maximum spacing, a high level corresponds to the minimum spacing and a medium level corresponds to the median or average spacing.

Figure 6:
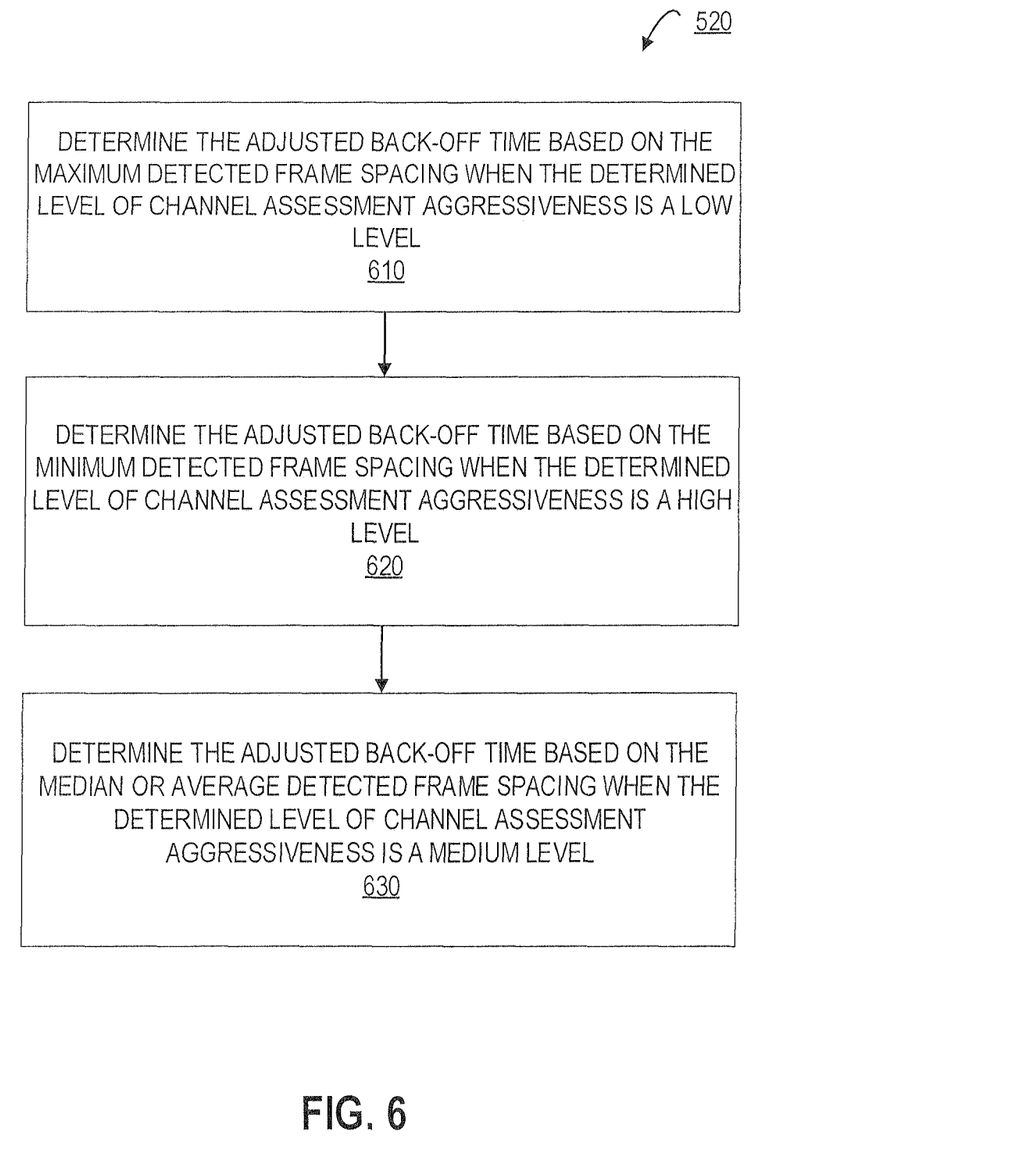
FIG. 6 is a flowchart illustrating a method for determining the adjusted back-off time based on detected frame spacing according to embodiments of the invention.

Referring now to FIG. 6, a flowchart illustrates a method 520 for determining the adjusted back-off time based on detected frame spacing according to embodiments of the invention. In step 610, a node may determine the adjusted back-off time based on the maximum detected frame spacing when the determined level of channel assessment aggressiveness is a low level, in step 620, a node may determine the adjusted back-off time based on the minimum detected frame spacing when the determined level of channel assessment aggressiveness is a high level, and in step 630, a node may determine the adjusted back-off time based on the average and/or median detected frame spacing when the determined level of channel assessment aggressiveness is a medium level.

Figure 7:
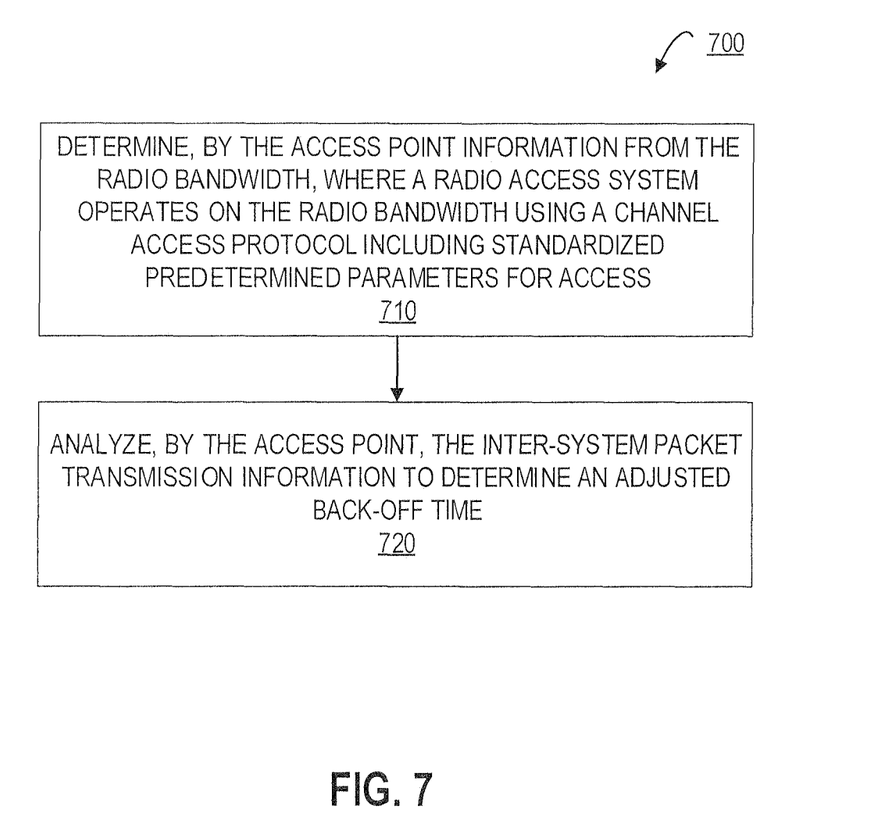
FIG. 7 is a flowchart illustrating a method for analyzing the information according to embodiments of the invention.
Figure 8:
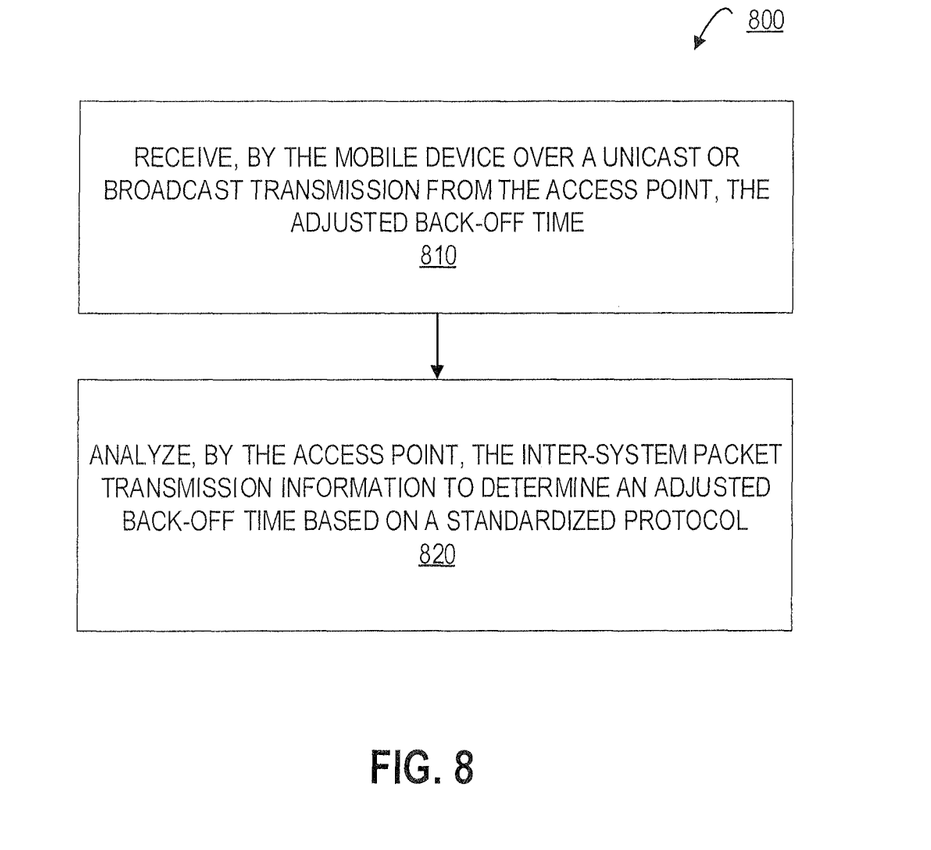
FIG. 8 is a flowchart illustrating a method for analyzing the information according to embodiments of the invention.

As discussed above, two configurations may be used in various embodiments of the invention. Configuration (I) is where each individual node takes measurements and selects individual back-off times based thereon and configuration (II) is where access points take measurements and select back-off times for stations within their coverage areas. Configuration (I) implies either standardized or non-standardized parameter selections for a specific radio access system; whereas configuration (II) uses a standardized protocol for communicating back-off times to stations. FIGS. 7 and 8 correspond to embodiments of configuration (II).

Referring now to FIG. 7, a flowchart illustrates a method 700 analyzing the information according to embodiments of the invention. First, as represented by block 710, an access point may determine information from the radio bandwidth. The radio access system operates on the radio bandwidth using a channel access protocol including standardized predetermined parameters for access. Second, as represented by block 720, an access point analyzes the inter-system packet transmission information to determine an adjusted back-off time.

Referring now to FIG. 8, a flowchart illustrates a method 800 for analyzing the information according to embodiments of the invention. First, as represented by block 810, a mobile device receives, over a unicast or broadcast transmission from an access point, the adjusted back-off time. Second, as represented by block 820, an access point analyzes the inter-system packet transmission information to determine the adjusted back-off time based on a standardized protocol.

Unless specified, the invention is not limited to any particular types of devices (either access points, UEs, stations or otherwise). As used herein, a device may also be referred to as a UE, a system, an access point or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for improving fairness among devices accessing a radio bandwidth, the devices including a mobile device using the radio bandwidth to access a radio access system using a channel access protocol, wherein the channel access protocol is a collision avoidance-type channel access protocol configured for using a back-off time before transmitting a retransmission, the method comprising:
   determining information by monitoring the radio bandwidth, the information comprising information indicating channel free lengths and channel busy lengths;
   analyzing the information by determining, from the information, statistics corresponding to detected frame spacings between packets and determining an adjusted back-off time based on the statistics; and
   implementing, by the mobile device, the adjusted back-off time before transmitting the retransmission over the radio bandwidth.

2. The method of claim 1, wherein the channel access protocol is the carrier sense multiple access (CSMA) protocol.

3. The method of claim 1, wherein determining the information further comprises:
   collecting transmission statistics related to the radio bandwidth.

4. The method of claim 1, wherein determining the information further comprises:
   collecting information indicating an amount of channel utilization.

5. The method of claim 1, wherein analyzing information further comprises:
   determining a level of channel assessment aggressiveness from a plurality of levels; and
   determining the adjusted back-off time based on the determined level of channel assessment aggressiveness.

6. The method of claim 5, wherein the statistics are indicative of at least a minimum, a maximum, and a median or average detected frame spacing;
   wherein the plurality of levels comprises a low level, a medium level and a high level;
   wherein determining the adjusted back-off time comprises:
      determining the adjusted back-off time based on the maximum detected frame spacing when the determined level of channel assessment aggressiveness is a low level;
      determining the adjusted back-off time based on the minimum detected frame spacing when the determined level of channel assessment aggressiveness is a high level; and
      determining the adjusted back-off time based on the median or average detected frame spacing when the determined level of channel assessment aggressiveness is a medium level.

7. The method of claim 1,
   wherein determining comprises determining, by the mobile device, information from the radio bandwidth; and
   wherein analyzing comprises analyzing, by the mobile device, the information to determine an adjusted back-off time.

8. The method of claim 1, wherein the channel access protocol comprises standardized, predetermined parameters for accessing the radio access system.

9. The method of claim 1, wherein the channel access protocol comprises non-standardized parameters for accessing the radio access system.

10. The method of claim 1, further comprising:
    receiving, by the mobile device and from an access point, the adjusted back-off time, wherein the access point analyzed the information to determine the adjusted back-off time.

11. The method of claim 10,
    wherein receiving comprises receiving, by the mobile device over a unicast transmission from the access point, the adjusted back-off time.

12. The method of claim 10,
    wherein receiving comprises receiving, by the mobile device over a broadcast transmission from the access point, the adjusted back-off time.

13. The method of any claim 10,
    wherein the access point analyzes the information to determine the adjusted back-off time based on a standardized protocol for establishing back-off times for devices.

14. The method of claim 1,
    wherein implementing the back-off time comprises:
       determining a random number corresponding to a wait time within the back-off time; and
       waiting the wait time before transmitting.

15. A mobile communication system for improving fairness among devices accessing a radio bandwidth, the devices including a mobile device using the radio bandwidth to access a radio access system using a channel access protocol, wherein the channel access protocol is a collision avoidance-type channel access protocol configured for using a back-off time before transmitting a retransmission, the mobile communication system comprising:
    an access point (AP); and
    a user equipment (UE) configured to operatively couple to the AP over a channel on a radio bandwidth, the user equipment configured to:
       determine information by monitoring from the radio bandwidth, the information comprising information indicating channel free lengths and channel busy lengths;

analyze the information determining, from the information, statistics corresponding to detected frame spacings between packets and determining an adjusted back-off time based on the statistics; and implement the adjusted back-off time before transmitting the retransmission over the radio bandwidth.

16. The mobile communication system of claim 15, wherein the channel access protocol is the carrier sense multiple access (CSMA) protocol.

17. The mobile communication system of claim 15, wherein determining the information further comprises:

collecting transmission statistics related to the radio bandwidth.

18. A computer program product, comprising a non-transitory computer-readable medium comprising computer-executable instructions for improving fairness among devices accessing a radio bandwidth, the devices including a mobile device using the radio bandwidth to access a radio access system using a channel access protocol, wherein the channel access protocol is a collision avoidance-type channel access protocol configured for using a back-off time before transmitting a retransmission in a mobile communication system, the instructions comprising:

instructions for determining information by monitoring the radio bandwidth, the information comprising information indicating channel free lengths and channel busy lengths;

instructions for analyzing the information determining, from the information, statistics corresponding to detected frame spacings between packets and determining an adjusted back-off time based on the statistics; and instructions for implementing the adjusted back-off time before transmitting the retransmission over the radio bandwidth.

* * * * *